United States Patent Office 3,216,112
Patented Nov. 9, 1965

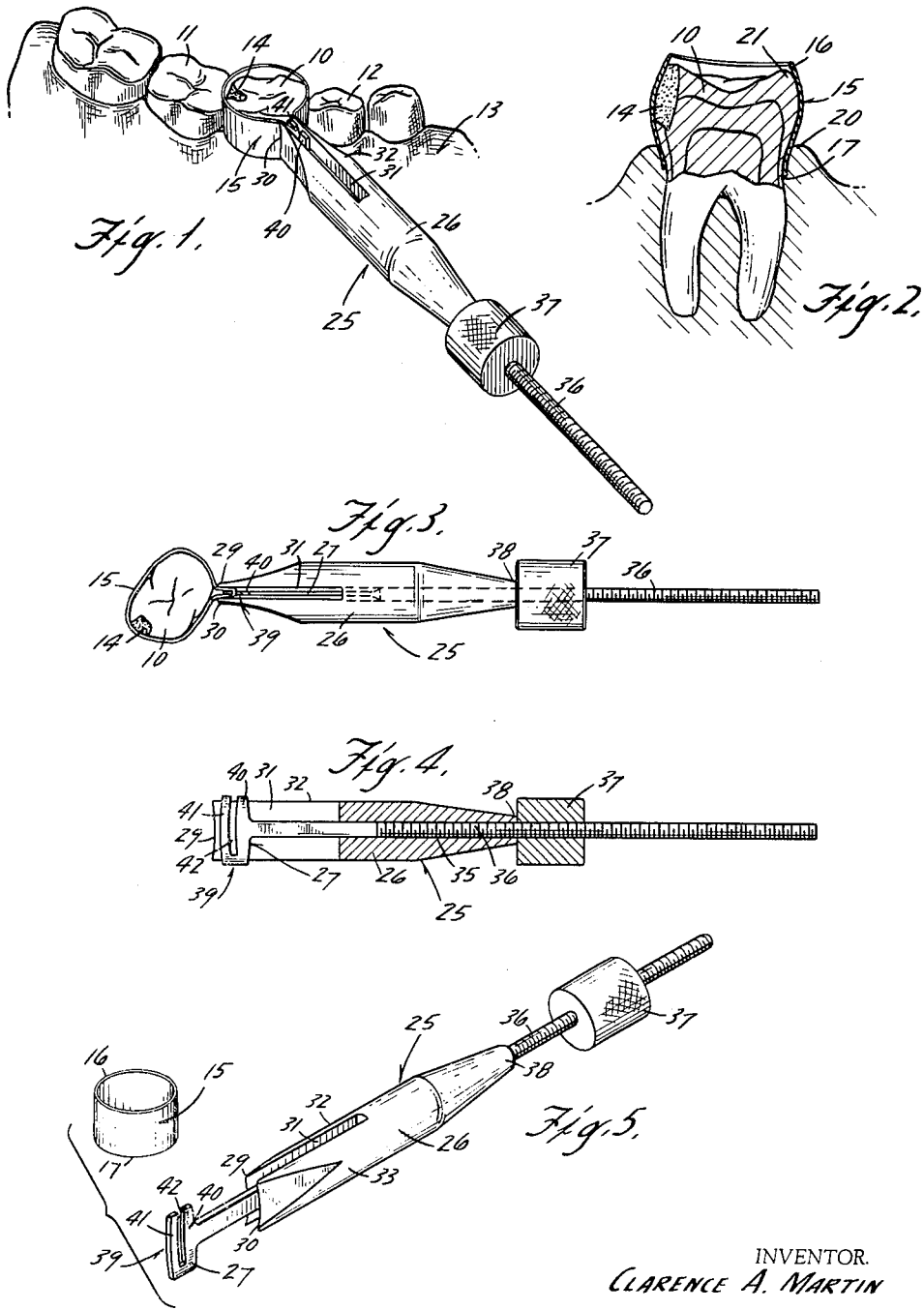

3,216,112
DENTAL MATRIX APPLICATION TOOL
Clarence A. Martin, 2028 Atwood Ave., Madison, Wis.
Filed Apr. 12, 1962, Ser. No. 186,999
5 Claims. (Cl. 32—64)

This invention relates to a dental matrix and tool therefor.

More particularly stated, this invention relates to the means for application to a tooth of a cylindrical matrix, a tool for applying, shaping, and snugging such matrix to the contours of a tooth and the facile release and removal of the matrix when repair of the subject tooth is completed.

In the development and use of this invention, it has been found that cylindrical matrix tubes of the proper semi-ductile materials in only two diameters of cylindrical matrix units are necessary to carry out the technique of operations adaptable to any tooth sizes or contours, and that a special tool, now newly devised, may be used to draw, shape, and contour the erstwhile non-conforming unit into tooth conforming operative usefulness.

In the drawings:

FIGURE 1 is a perspective view of the cylindrical matrix in position upon one of several teeth in a patient's jaw fragmentarily shown, the new tool for drawing and snugging the matrix being shown in an intermediate stage of the drawing and snugging operation.

FIGURE 2 is a vertical section through a tooth and a portion of adjacent jaw and gum with the matrix in snugged position upon the tooth, the root portions of the tooth being shown in elevation.

FIGURE 3 is a plan view of a tooth with the matrix and matrix snugging tool in tightened position.

FIGURE 4 is a vertical section through the dental tooth shown in FIGURE 3, but omitting the matrix and tooth.

FIGURE 5 is an exploded view in perspective showing the cylindrical matrix and the completely "opened" tool in readiness for reception of the matrix upon the drawhead which forms the principal operating element of the tool.

When a tooth, such as tooth 10 shown in FIGURE 1 with its companion teeth 11 and 12 respectively in the jaw 13 of a patient requiring repair of such tooth 10, is prepared for amalgam or other filling, for instance at 14, it is common practice to closely encompass the side walls of the tooth 10 with a matrix. Heretofore the matrix has been provided either in the form of a strip of relatively soft metal or other suitable strip or tape shaped material, or a preformed matrix in the shape of a bottomless cup has been applied to the tooth and then the handle-like portion of the "cup" has been squeezed to tighten the walls of the cup against the sides of the tooth (see U.S. Letters Patent 2,674,801, issued April 13, 1954 to Trangmar).

Contrasted with this, I have been able to utilize one or the other of just two sizes of seamless, cylindrical matrix material 15 receivable on a tooth as shown in FIGURE 1. The length of the tube 15 is such as to permit of the trimming of top and bottom margins 16 or 17 respectively with ordinary scissors to suit the configuration of the gum line 20 or the upper margins 21 of the tooth. It will be understood, however, that in accord with this invention the cylinder 15 is of such diameter as applied to the particular tooth that there is ample excess material of the matrix 15 to accommodate the tool and technique of operation of the tool 25 now to be described.

This new tool has three structural parts: a bifurcated bladed body 26, a drawhead 27 and a drawhead nut 28. The forwardly extending blades 29 and 30 of the body 26 comprise the blade-like margins of either side of a slot 31 which bifurcates the tool body, and the body portions 32 and 33 comprise very rigid forwardly extended portions, the shape of which determines that these blades 29 and 30 can withstand the tendency to spread them while the work described below is being carried on.

It will be noted that rearwardly of the slot 31, the body 26 of the tool is bored at 35 to slidably receive a threaded shank 36 of drawhead 27. A substantial portion of the length of the shank 36 of the drawhead is threaded, and a knurled nut 37 is in threaded engagement with the threaded shank so that this nut may be brought into abutment against the rear end of body 26.

Special attention is directed to the shape of drawhead 27. The flattened end of the shank 36 is shaped as shown most clearly in FIGURE 5 where it will be seen that a very strong hook-shaped head 39 includes a base 40 which is slightly spaced from draw hook 41 (hereinafter called a "tensor") whereby matrix 15 may be received between the base 40 and the hook 41. Furthermore, it will be noted that the open hook slot 42 to receive the wall of the matrix 15 has contoured walls so curved as to cause the hook to pull most forcefully upon the margins 16 and 17, and less forcefully on the mid-portion of the wall of matrix 15. It will thus be seen that when nut 37 abuts the rear end 38 of body 26 of the tool 25, the shank of the drawhead 27 may, upon continued rotation of nut 37 in the proper direction on the threads pull the drawhead into the slot 31 between the bladed margins of that slot, and since the width of the slot is somewhat wider than the drawhead, it is possible for a portion of the wall of the matrix 15 to be pulled into the slot in a swaging, squeezing movement.

In operation, it will be understood that the tooth to be repaired has the cavity at 14 properly prepared for an amalgam or other suitable filling. The cylindrical matrix 15, properly trimmed to fit the particular tooth and gum, is positioned about the tooth approximately as shown in FIGURE 1. The tool 25 theretofor adjusted to the position of the parts shown in FIGURE 5 is hooked onto the matrix 15 as shown in FIGURES 1 and 3, so that upon adjustment of the nut 37, the drawhead 27 and the portion of the matrix 15 will be pulled into the slot 31. As the movement progresses, with continued rotation of the nut 37 against the end 38 of the tool, the pliable material of the matrix 15 is pulled more snugly adjacent the top and bottom margins 16–17 of the matrix because of the curved hook-shaped contour of the tool hook 41. This snugs the matrix tightly against the tooth as shown in FIGURE 2. When the proper degree of snugness has been attained by the rotation of the nut 37, the apparatus and the tooth 10 are prepared for the amalgam or other filling to be applied or inserted at 14.

When the dentist has completed the filling of the tooth in the manner well-known in his professional art, the nut 37 may be threadedly "backed off" from the end 38 of the tool, and the nut may be used to manually push the base 40 against the portion of the wall of matrix 15 which has theretofor been drawn into the slot 31, and thus automatically the increased looseness for release of the matrix 15 from the tooth 10 will be attained.

It will now be seen that no preliminary cupping of a matrix is necessary. The usual bulbous shape of a tooth is accommodated by the conformation of the cylindrical matrix to the contour of the tooth under the special stressing of the portions of the matrix wall adjacent the margin 16 or 17. If desired, the frontal bladed edges at 29 and 30 may be concaved as shown clearly in FIGURE 4, so that the special snugging of the upper and lower portions of the matrix about the bulbous tooth may be accentuated.

I claim:

1. Means for matrix application of a tubular matrix about a tooth; said means comprising a pair of connected, closely spaced rigid blades having ends shaped for blade presentation against said tubular matrix in situ about a tooth; a hooked drawhead receivable between said blades and extending therebeyond, said drawhead having a tensor including a shank and a tensor hook having a tensor finger extending substantially normally to the axis of the shank of the drawhead, the inner edge of the tensor finger being curved concavely toward the shank in a plane including said axis, said hook being receivable between said tubular matrix and the tooth; the drawhead and said spaced blades having interengageable means including said shank for drawing the tensor finger and a portion of the wall of the tube between the blades whereby to snug the matrix tube about the tooth.

2. For constriction of a tubular matrix applied coaxially about a tooth; a drawhead comprising a shark and a contoured tensor, said tensor including a curved finger lying in a plane normal to the axis of said shank and shaped for reception between the tooth and said matrix; the inner edge of the tensor finger being curved concavely toward the shank portion of the drawhead; a drawhead base shaped for presentation against the outside of the matrix, said drawhead base comprising a body having a bifurcated portion to receive said drawhead, said drawhead being mounted on said body for longitudinal movement within the bifurcated portion of said body, the drawhead and said spaced blades having interengageable means including said shank for drawing the tensor finger and a portion of the wall of the tube between the blades whereby to snug the matrix tube about the tooth.

3. In a tool for tightening a cylindrical matrix about a tooth, a body having forwardly extended spaced open ended arms for extension toward a tooth and a drawhead receiving slot therebetween, a shanked drawhead in adjustable relation to said body positioned whereby said drawhead is adjustably progressively receivable between the open ends and between said arms, and a draw hook forming part of said head and having a curved slotted portion comprising a finger positioned to be received between said tooth and said matrix, said finger lying in the plane of the axis of movement of the shanked drawhead and extending substantially normally to said axis; the inner edge of said finger being curved concavely toward the shank portion of the drawhead; the drawhead and said body having interengageable means including said shank for drawing the said finger and a portion of the wall of the tube into said drawhead receiving slot whereby to snug the matrix tube about the tooth.

4. The tool of claim 3 in which the interengageable means comprise; a bore through said body aligned between the arms, threads on the shank of the drawhead, said drawhead being positioned in said bore and having a nut thereon for adjustment against the body about said bore whereby to pull the hook between said arms, the open ends of said arms being concavely curved.

5. The tool of claim 3 in which the curved portion of the hook comprising the finger is shaped and curved in a direction to constrict the margins of the matrix more tightly about the tooth and the ends of the arms are concavely blade edged for abutment against the cylindrical matrix at each side of the hook.

References Cited by the Examiner
UNITED STATES PATENTS

| | | | |
|---|---|---|---|
| 713,041 | 11/02 | Townsend | 32—63 |
| 980,529 | 1/11 | Ivory | 32—63 |
| 2,722,746 | 11/55 | Brenner | 32—63 |
| 2,853,782 | 9/58 | Gruenwald | 32—63 |

RICHARD A. GAUDET, *Primary Examiner.*

RICHARD J. HOFFMAN, ROBERT E. MORGAN,
*Examiners.*